United States Patent
Gelay et al.

(10) Patent No.: US 8,985,461 B2
(45) Date of Patent: Mar. 24, 2015

(54) MOBILE DEVICE HAVING AN IMPROVED USER INTERFACE FOR READING CODE SYMBOLS

(71) Applicant: Hand Held Products, Inc., Fort Mill, SC (US)

(72) Inventors: Geoffrey Gelay, West Deptford, NJ (US); Robert Michael Hussey, Waxhaw, NC (US); Bhishma Thakkar, Huntingdon Valley, PA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 13/930,913

(22) Filed: Jun. 28, 2013

(65) Prior Publication Data

US 2015/0001302 A1    Jan. 1, 2015

(51) Int. Cl.
*G06K 7/10* (2006.01)
*G06K 7/015* (2006.01)

(52) U.S. Cl.
CPC .................................... *G06K 7/015* (2013.01)
USPC .................................. 235/462.2; 235/462.11

(58) Field of Classification Search
CPC ...................... G06K 7/10722; G06K 7/10821
USPC ......................................... 235/462.2, 462.11
See application file for complete search history.

(56) References Cited

U.S. PATENT DOCUMENTS

| | | | |
|---|---|---|---|
| 6,298,176 B2 | 10/2001 | Longacre et al. | |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |

(Continued)

FOREIGN PATENT DOCUMENTS

| | | |
|---|---|---|
| EP | 2093695 A1 | 8/2009 |
| WO | 2013163789 A1 | 11/2013 |

(Continued)

OTHER PUBLICATIONS

U.S. Appl. No. 13/367,978, filed Feb. 7, 2012, (Feng et al.); now abandoned.

(Continued)

*Primary Examiner* — Allyson Trail
(74) *Attorney, Agent, or Firm* — Additon, Higgins & Pendleton, P.A.

(57) ABSTRACT

A mobile device includes a camera, a user interface system, and a processor communicatively coupled to the camera and the user interface system. The user interface system includes a visual display. The processor is configured for (i) capturing an image including a code symbol, (ii) displaying the image on the visual display, (iii) determining whether the code symbol in the image is readable by the processor, and (iv) displaying on the visual display a positive indicator overlaying the code symbol in the image when the processor determines that the code symbol in the image is readable by the processor. The processor is further configured for reading the code symbol in the image in response to a selection input received from the user interface system.

20 Claims, 3 Drawing Sheets

(56) References Cited

U.S. PATENT DOCUMENTS

| | | | |
|---|---|---|---|
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van Horn et al. | |
| 8,408,469 B2 | 4/2013 | Good | |
| 8,424,768 B2 | 4/2013 | Rueblinger et al. | |
| 8,437,530 B1* | 5/2013 | Mennie et al. | 382/135 |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 2005/0103850 A1* | 5/2005 | Mergenthaler et al. | 235/462.08 |
| 2006/0010042 A1* | 1/2006 | Gianakis et al. | 705/26 |
| 2007/0063048 A1 | 3/2007 | Havens et al. | |
| 2008/0105747 A1 | 5/2008 | Orlassino | |
| 2008/0185432 A1 | 8/2008 | Caballero et al. | |
| 2009/0134221 A1 | 5/2009 | Zhu et al. | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2011/0169999 A1 | 7/2011 | Grunow et al. | |
| 2011/0202554 A1 | 8/2011 | Powilleit et al. | |
| 2011/0310274 A1* | 12/2011 | Kuriyama | 348/231.99 |
| 2012/0111946 A1 | 5/2012 | Golant | |
| 2012/0138685 A1 | 6/2012 | Qu et al. | |
| 2012/0168511 A1 | 7/2012 | Kotlarsky et al. | |
| 2012/0168512 A1 | 7/2012 | Kotlarsky et al. | |
| 2012/0173347 A1 | 7/2012 | De Almeida Neves et al. | |
| 2012/0193407 A1 | 8/2012 | Barten | |
| 2012/0193423 A1 | 8/2012 | Samek | |
| 2012/0203647 A1 | 8/2012 | Smith | |
| 2012/0223141 A1 | 9/2012 | Good et al. | |
| 2012/0228382 A1 | 9/2012 | Havens et al. | |
| 2012/0248188 A1 | 10/2012 | Kearney | |
| 2013/0027757 A1* | 1/2013 | Lee et al. | 358/450 |
| 2013/0043312 A1 | 2/2013 | Van Horn | |
| 2013/0056285 A1 | 3/2013 | Meagher | |
| 2013/0070322 A1 | 3/2013 | Fritz et al. | |
| 2013/0075168 A1 | 3/2013 | Amundsen et al. | |
| 2013/0082104 A1 | 4/2013 | Kearney et al. | |
| 2013/0121468 A1* | 5/2013 | Ohta et al. | 378/63 |
| 2013/0126615 A1* | 5/2013 | McCloskey et al. | 235/462.25 |
| 2013/0135198 A1* | 5/2013 | Hodge et al. | 345/156 |
| 2013/0175341 A1 | 7/2013 | Kearney et al. | |
| 2013/0175343 A1 | 7/2013 | Good | |
| 2013/0181053 A1* | 7/2013 | Harris | 235/462.11 |
| 2013/0194192 A1* | 8/2013 | Andolina | 345/173 |
| 2013/0200158 A1 | 8/2013 | Feng et al. | |
| 2013/0214048 A1 | 8/2013 | Wilz | |
| 2013/0256418 A1 | 10/2013 | Havens et al. | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0278425 A1 | 10/2013 | Cunningham et al. | |
| 2013/0287258 A1 | 10/2013 | Kearney | |
| 2013/0292474 A1 | 11/2013 | Xian et al. | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306730 A1 | 11/2013 | Brady et al. | |
| 2013/0306731 A1 | 11/2013 | Pedraro | |
| 2013/0306734 A1 | 11/2013 | Xian et al. | |
| 2013/0307964 A1 | 11/2013 | Bremer et al. | |
| 2013/0308625 A1 | 11/2013 | Corcoran | |
| 2013/0313324 A1 | 11/2013 | Koziol et al. | |
| 2013/0313325 A1 | 11/2013 | Wilz et al. | |
| 2013/0313326 A1 | 11/2013 | Ehrhart | |
| 2013/0327834 A1 | 12/2013 | Hennick et al. | |
| 2013/0341399 A1 | 12/2013 | Xian et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008430 A1 | 1/2014 | Soule et al. | |
| 2014/0008439 A1 | 1/2014 | Wang | |
| 2014/0021256 A1 | 1/2014 | Qu et al. | |

(56) References Cited

U.S. PATENT DOCUMENTS

| | | | |
|---|---|---|---|
| 2014/0025584 A1 | 1/2014 | Liu et al. | |
| 2014/0027517 A1* | 1/2014 | Gu | 235/462.06 |
| 2014/0027518 A1 | 1/2014 | Edmonds et al. | |
| 2014/0034723 A1 | 2/2014 | Van Horn et al. | |
| 2014/0034734 A1 | 2/2014 | Sauerwein | |
| 2014/0036848 A1 | 2/2014 | Pease et al. | |
| 2014/0039693 A1 | 2/2014 | Havens et al. | |
| 2014/0042814 A1 | 2/2014 | Kather et al. | |
| 2014/0049120 A1 | 2/2014 | Kohtz et al. | |
| 2014/0049635 A1 | 2/2014 | Laffargue et al. | |
| 2014/0061305 A1 | 3/2014 | Nahill et al. | |
| 2014/0061306 A1 | 3/2014 | Wu et al. | |
| 2014/0061307 A1 | 3/2014 | Wang et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Venancio | |
| 2014/0074746 A1 | 3/2014 | Wang | |
| 2014/0075846 A1 | 3/2014 | Woodburn | |
| 2014/0076974 A1 | 3/2014 | Havens et al. | |
| 2014/0078341 A1 | 3/2014 | Havens et al. | |
| 2014/0078342 A1 | 3/2014 | Li et al. | |
| 2014/0078345 A1 | 3/2014 | Showering | |
| 2014/0084068 A1 | 3/2014 | Gillet et al. | |
| 2014/0086348 A1 | 3/2014 | Peake et al. | |
| 2014/0097249 A1 | 4/2014 | Gomez et al. | |
| 2014/0098284 A1 | 4/2014 | Oberpriller et al. | |
| 2014/0098792 A1 | 4/2014 | Wang et al. | |
| 2014/0100774 A1 | 4/2014 | Showering | |
| 2014/0100813 A1 | 4/2014 | Showering | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Li et al. | |
| 2014/0104451 A1 | 4/2014 | Todeschini et al. | |
| 2014/0106594 A1 | 4/2014 | Skvoretz | |
| 2014/0106725 A1 | 4/2014 | Sauerwein | |
| 2014/0108010 A1 | 4/2014 | Maltseff et al. | |
| 2014/0108402 A1 | 4/2014 | Gomez et al. | |
| 2014/0108682 A1 | 4/2014 | Caballero | |
| 2014/0110485 A1 | 4/2014 | Toa et al. | |
| 2014/0114530 A1 | 4/2014 | Fitch et al. | |
| 2014/0121438 A1 | 5/2014 | Kearney | |
| 2014/0121445 A1 | 5/2014 | Ding et al. | |
| 2014/0124577 A1 | 5/2014 | Wang et al. | |
| 2014/0124579 A1 | 5/2014 | Ding | |
| 2014/0125842 A1 | 5/2014 | Winegar | |
| 2014/0125853 A1 | 5/2014 | Wang | |
| 2014/0125999 A1 | 5/2014 | Longacre et al. | |
| 2014/0129378 A1 | 5/2014 | Richardson | |
| 2014/0131441 A1 | 5/2014 | Nahill et al. | |
| 2014/0133379 A1 | 5/2014 | Wang et al. | |
| 2014/0140585 A1 | 5/2014 | Wang | |
| 2014/0151453 A1 | 6/2014 | Meier et al. | |
| 2014/0160329 A1 | 6/2014 | Ren et al. | |

FOREIGN PATENT DOCUMENTS

| | | |
|---|---|---|
| WO | 2013173985 A1 | 11/2013 |
| WO | 2014019130 A1 | 2/2014 |

OTHER PUBLICATIONS

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

(56) References Cited

OTHER PUBLICATIONS

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion filed Mar. 4, 2014 (Lui et al.); 25 pages.

U.S. Appl. No. 14/342,544 for Imaging Based Barcode Scanner Engine with Multiple Elements Supported on a Common Printed Circuit Board filed Mar. 4, 2014 (Liu et al.); 27 pages.

U.S. Appl. No. 14/257,174 for Reading Apparatus Having Partial Frame Operating Mode filed Apr. 21, 2014, (Barber et al.), 67 pages.

U.S. Appl. No. 14/200,405 for Indicia Reader for Size-Limited Applications filed Mar. 7, 2014 (Feng et al.); 42 pages.

U.S. Appl. No. 14/166,103 for Indicia Reading Terminal Including Optical Filter filed Jan. 28, 2014 (Lu et al.); 29 pages.

U.S. Appl. No. 14/274,858 for Mobile Printer With Optional Battery Accessory, filed May 12, 2014, (Marty et al.), 26 pages.

U.S. Appl. No. 14/264,173 for Autofocus Lens System for Indicia Readers filed Apr. 29, 2014, (Ackley et al.), 39 pages.

U.S. Appl. No. 14/230,322 for Focus Module and Components with Actuator filed Mar. 31, 2014 (Feng et al.); 92 pages.

U.S. Appl. No. 14/222,994 for Method and Apparatus for Reading Optical Indicia Using a Plurality of Data filed Mar. 24, 2014 (Smith et al.); 30 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

EP Search Report and Opinion for EP Application No. 14173165.3-1811 dated Nov. 19, 2014. 6 pages.

* cited by examiner

MOBILE DEVICE HAVING AN IMPROVED USER INTERFACE FOR READING CODE SYMBOLS

FIELD OF THE INVENTION

The present disclosure generally relates to the field of mobile devices. More specifically, the present disclosure relates to mobile devices having an improved user interface for reading code symbols.

BACKGROUND

Over the past forty years, businesses have sought to maximize efficiency by using various devices to automate data entry. In the important area of inventory management, in particular, the symbol reading device (e.g., barcode reader, barcode scanner or RFID reader) has greatly reduced the time and errors inherent to manual data entry. Symbol reading devices are often employed to decode barcodes. A barcode is a machine-readable representation of information in graphic format. Traditionally, a barcode is a series of parallel bars and spaces of varying widths (e.g., a linear barcode or ID barcode). More recently, there has been an increase in the use of alternatives to the linear barcode, for example matrix codes (e.g., 2D barcodes, QR Code, Aztec Code, Data Matrix) and Optical Character Recognition (OCR) have enjoyed increasing popularity as the technology advances. As used herein, the terms barcode and code symbol are intended in their broadest sense to include linear barcodes, matrix barcodes, and OCR-enabled labels. Barcode readers (e.g., optical readers) tend to fall into one of three categories: wand readers, laser scan engine barcode readers, and image sensor based barcode readers.

Wand readers generally comprise a single light source and single photodetector housed in a pen shaped housing. A user drags the wand reader across a decodable symbol (e.g., a barcode) and a signal is generated representative of the bar space pattern of the barcode.

Laser scan engine based barcode readers comprise a laser diode assembly generating a laser light beam and a moving mirror for sweeping the laser light beam across a decodable symbol, wherein a signal is generated corresponding to the decodable symbol.

Image sensor based barcode readers comprise multi element image sensors such as CID, CMOS, or CCD image sensors and an imaging optic for focusing an image onto the image sensor. In the operation of an image sensor based barcode reader, an image of a decodable symbol is focused on an image sensor and a signal is generated corresponding to the signal. Image sensor elements may be arrayed in a line or in a rectangular matrix or area. Area image sensors capture a digital picture and use software algorithms to find and decode one or more symbols.

Users of laser scanner engine based barcode readers have been switching in increasing numbers to image sensor based barcode readers. Image sensor based barcode readers are more durable and offer additional features relative to laser scan engine based barcode readers. Features and functions which have been incorporated into image sensor based barcode readers involve image processing.

Exemplary optical readers are described in U.S. Pat. No. 6,298,176; U.S. Pat. No. 7,159,783; and U.S. Pat. No. 7,413,127; each of which is hereby incorporated by reference in its entirety.

Recently, the widespread availability of mobile devices such as smartphones and tablet computers, and their continually improving functionality, has led businesses and consumers alike to employ these mobile devices as code symbol readers. In this regard, smartphones and tablet computers typically have an internal video camera that can be employed for image scanning.

Unlike conventional symbol reading devices, which typically have an aiming indicator that can be projected onto a code symbol (e.g., barcode, linear barcode, matrix barcode, letter strings, number strings) with an LED or laser, smartphones and tablet computers typically lack a built-in aiming indicator. Accordingly, decoding software for smartphones and tablet computers typically utilizes a user interface with a real-time display from the internal video camera to aid users in aiming at the code symbol. A continuous graphic pattern is typically overlaid on the real-time display to further aid with aiming. For example, a horizontal line that mimics a laser scan line may be painted on the display, so that a user can orient the device so that the horizontal line cuts through the barcode. Alternatively, a graphic pattern delimiting a reduced region of interest may be painted on the display, so that a user can position the barcode within the region of interest. In addition to lacking a satisfactory way to direct the aim of the scanning operation of the mobile device, mobile devices also lack an intuitive trigger to activate the scanning operation. Typically, scanning is initiated whenever a readable barcode enters the mobile device's field of view in a proper orientation. When multiple barcodes are in the field of view, however, it can lead to user confusion about which barcode was actually scanned. Accordingly, a need exists for a mobile device with an improved user interface for code symbol reading.

SUMMARY

The present invention embraces a mobile device (e.g., smartphone, tablet computer) that includes a camera, a user interface system having a visual display, and a processor. The processor is communicatively coupled to the camera and the user interface system. The processor is configured for capturing from the camera an image depicting a code symbol; displaying the image on the visual display; and determining whether the code symbol in the image is readable by the processor. The processor is further configured for displaying on the visual display a positive indicator overlaying the code symbol in the image when the processor determines that the code symbol in the image is readable by the processor.

In another aspect, the disclosure embraces a method of reading a code symbol with a mobile device. A mobile device is provided. The mobile device includes a camera, a user interface system having a visual display, and a processor communicatively coupled to the camera and the user interface system. An image that includes a code symbol is captured with the camera. The image is displayed on the visual display. The processor determines whether the code symbol is readable by the processor. When the processor determines that the code symbol is readable by the processor, a positive indicator is displayed on the display screen overlaying the code symbol.

An object of the present disclosure is to provide a mobile device having an improved user interface for code symbol reading.

Another object of the present disclosure is to provide a mobile device having a user interface that simplifies the selection of the code symbol that the user desires to decode.

Another object of the present disclosure is to provide a mobile device having an improved user interface that automatically indicates to the user whether a code symbol is readable.

Another object of the present disclosure is to provide a mobile device having an improved user interface featuring an intuitive means of selecting a code symbol.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

To more fully understand the objects of the disclosure, the following detailed description of the illustrative embodiments should be read in conjunction with the accompanying drawings, wherein.

DETAILED DESCRIPTION

The present invention embraces a mobile device (e.g., cellular phone, smartphone, tablet device, personal digital assistant, portable computer, vehicle-mount computer) having an improved user interface for reading code symbols. The mobile device according to the present disclosure includes a camera, a user interface system having a visual display, and a processor. The processor is communicatively coupled to the camera and the user interface system. The processor is configured for capturing from the camera an image depicting a code symbol; displaying the image on the visual display; and determining whether the code symbol in the image is readable by the processor. The processor is further configured for displaying on the visual display a positive indicator overlaying the code symbol in the image when the processor determines that the code symbol in the image is readable by the processor.

Figure 1:
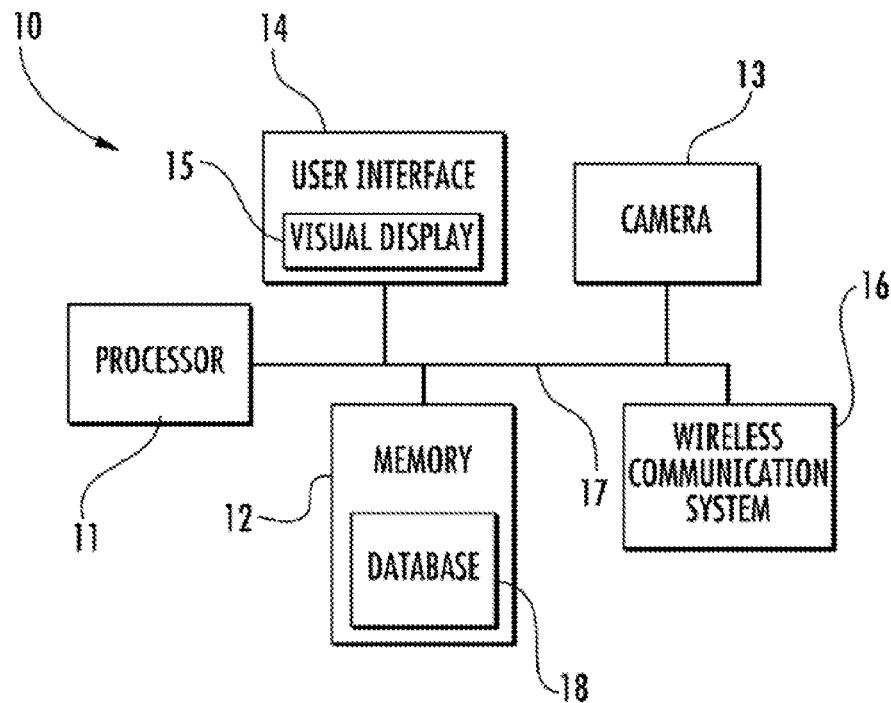
FIG. 1 is a schematic block diagram of an exemplary mobile device according to the present disclosure.
Figure 2:
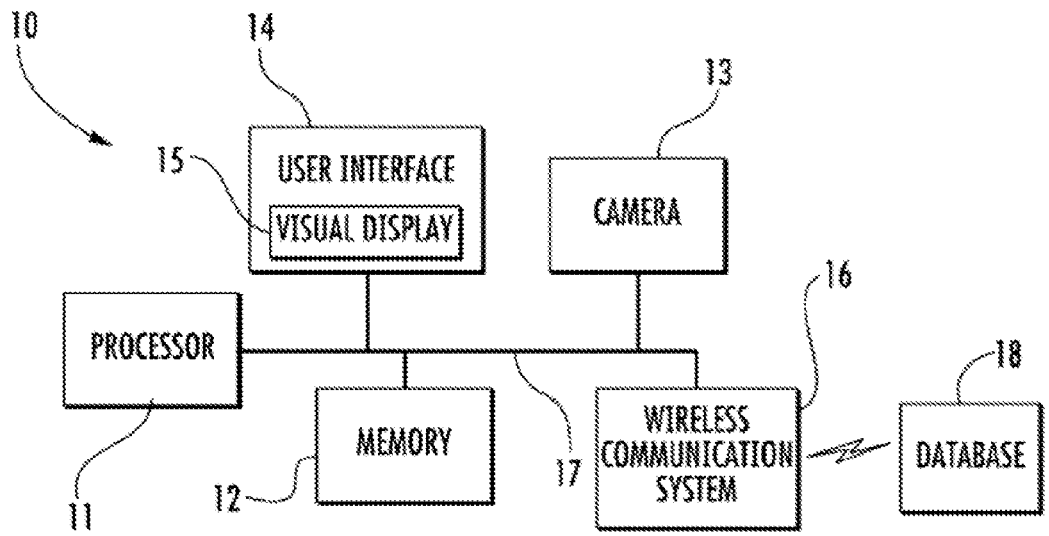
FIG. 2 is a schematic block diagram of an alternative embodiment of an exemplary mobile device according to the present disclosure.
Figure 3:
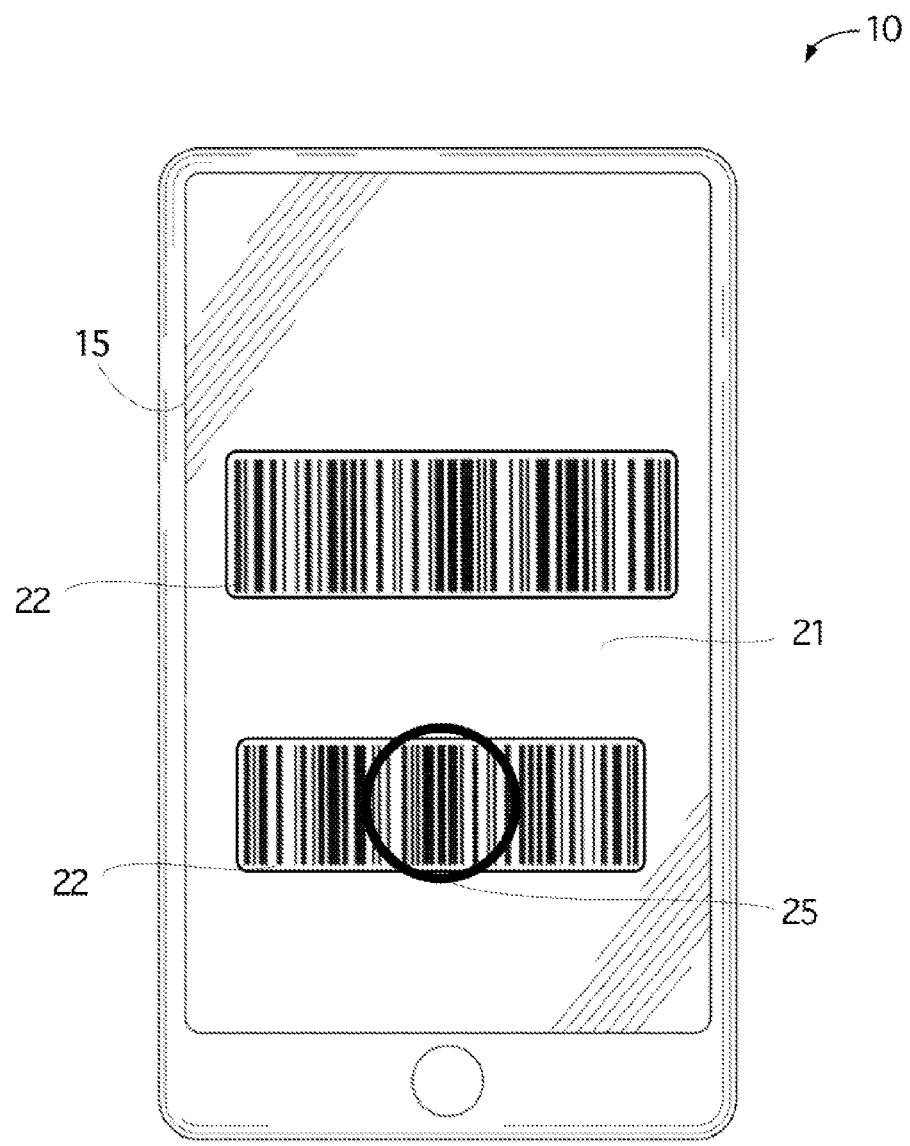
FIG. 3 is a graphic depiction of a user interface of a mobile device according to the present disclosure.

FIGS. 1 and 2 schematically depict two exemplary mobile devices 10 in accordance with the present disclosure. The mobile device 10 typically includes a processor 11, a memory 12, a camera 13, a user interface 14, and a wireless communication system 16. The processor 11 is communicatively coupled to the memory 12, the camera 13, the user interface 14, and the wireless communication system 16.

Exemplary mobile devices may include a system bus 17 and/or one or more interface circuits (not shown) for coupling the processor 11 and other components to the system bus 17. In this regard, the processor 11 may be communicatively coupled to each of the other components via the system bus 17 and/or the interface circuits. Similarly, the other components (e.g., the memory 12, the camera 13, the user interface 14, and the wireless communication system 16) may each be communicatively coupled to other components via the system bus 17 and/or the interface circuits. Other embodiments of system bus architecture providing for efficient data transfer and/or communication between the components of the device may also be employed in exemplary embodiments in accordance with the present disclosure.

Typically, the processor 11 is configured to execute instructions and to carry out operations associated with the mobile device 10. For example, using instructions retrieved from the memory 12 (e.g., a memory block), the processor 11 may control the reception and manipulation of input and output data between components of the mobile device 10. The processor 11 typically operates with an operating system to execute computer code and produce and use data. The operating system, other computer code, and data may reside within the memory 12 that is operatively coupled to the processor 11. The memory 12 generally provides a place to store computer code and data that are used by the mobile device 10. The memory 12 may include Read-Only Memory (ROM), Random-Access Memory (RAM), a hard disk drive, and/or other non-transitory storage media. The operating system, other computer code, and data may also reside on a removable non-transitory storage medium that is loaded or installed onto the mobile device 10 when needed. Exemplary removable non-transitory storage media include CD ROM, PC-CARD, memory card, floppy disk, and/or magnetic tape.

The user interface system 14 includes one or more components capable of interacting with a user (e.g., receiving information from a user or outputting information to a user). As depicted in FIG. 1, the user interface system 14 includes a visual display 15. Typically, the visual display 15 is a touchscreen, which is capable of displaying visual information and receiving tactile commands from a user (e.g., selections made by touching the screen with a finger or a stylus, by pointing at a desired selection, or by looking at a desired selection for a predefined period of time). In addition to the visual display 15, the user interface system 14 may also include one or more speakers, buttons, keyboards, and/or microphones.

As noted, the mobile device 10 typically includes a wireless communication system 16. The wireless communication system 16 enables the mobile device 10 to communicate with a wireless network, such as a cellular network (e.g., a GSM network, a CDMA network, or an LTE network), a local area network (LAN), and/or an ad hoc network.

The camera 13 may be any device that is able to capture still photographs and/or video. Typically, the camera 13 is able to capture both still photographs and video. Although FIG. 1 depicts the mobile device 10 as having a single camera 13, it is within the scope of the present invention for the mobile device 10 to include more than one camera.

The processor 11 is typically in communication with a database 18. As depicted in FIG. 1, the database 18 may be stored within the memory 12. In an alternative embodiment depicted in FIG. 2, the processor 11 may access the database 18 via the wireless communication system 16. In other words, the processor may access the database 18 through the internet or a local area network via the wireless communication system 16.

The database 18 includes information associated with a code symbol. Typically, the database 18 includes information relevant to stock management and/or retail transactions. For example, the database 18 may include relevant information (e.g., name, price, size, associated barcode, stocking location, and/or quantity) regarding goods sold in a retail store. It will be appreciated by one of ordinary skill in the art that the processor 11 does not necessarily need to be in communication with a database 18. For instance, some code symbols (e.g., matrix barcodes) may contain all the necessary data, thereby eliminating a need for the processor 11 to look up associated data on a database 18.

Figure 4:
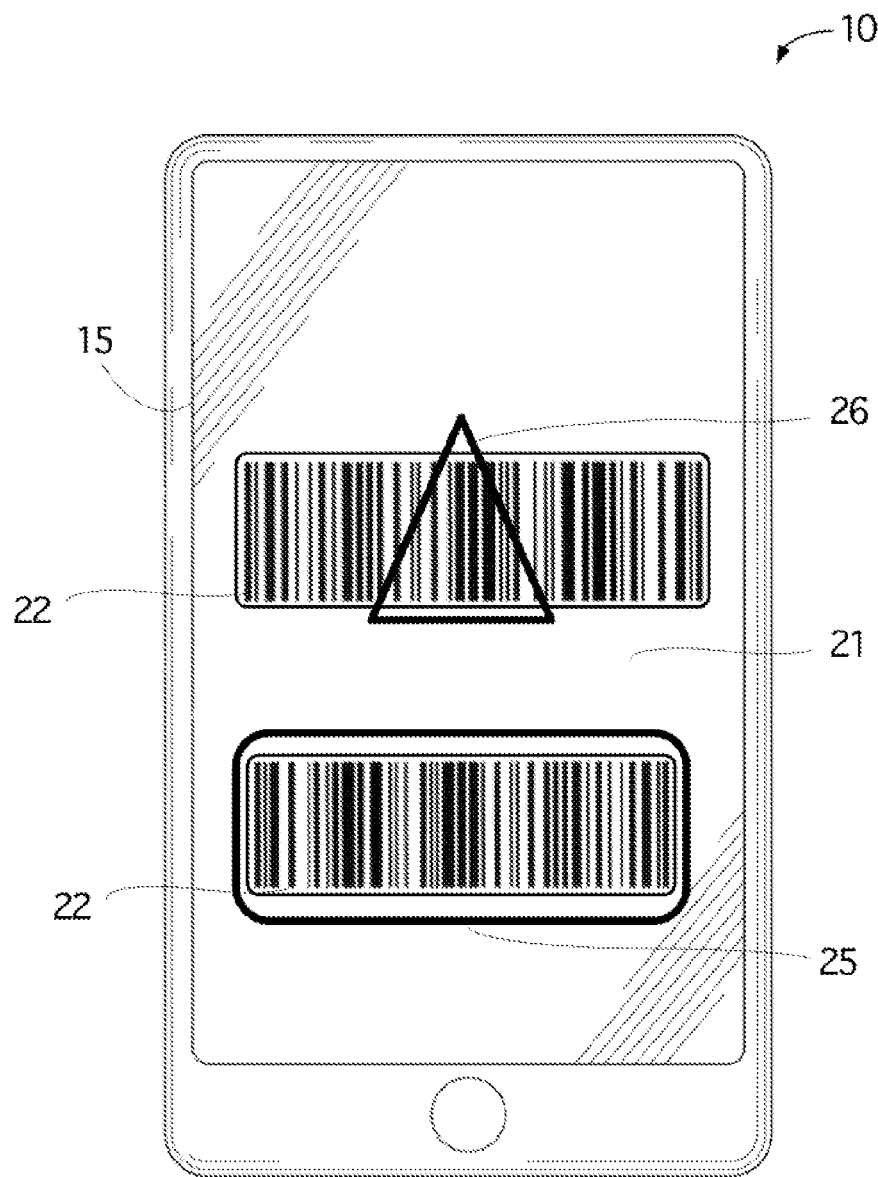
FIG. 4 is a graphic depiction of a user interface of a mobile device according to the present disclosure.

Turning now to FIGS. 4 and 5, which graphically depict an exemplary user interface of a mobile device 10 according to the present disclosure. To read a code symbol, the processor 11 is configured to capture an image from the camera 13 (e.g., after receiving a user command from the user interface 14 to begin a code symbol reading sequence). Typically the image will contain one or more code symbols 22. For example, an image 21 of a shipped package may show a shipping barcode and a product barcode. The processor 11 displays the image 21 on the visual display 15. Typically, the image 21 is a real-time video feed, which advantageously allows the user to determine what code symbols 22 will appear in the display by maneuvering the mobile device 10 to bring the desired code symbols 22 into the field of view of the camera 13. The processor 11 dynamically analyzes the displayed image 21 to determine whether a code symbol 22 in the image 21 is readable by the processor 11. A code symbol 22 is readable by the processor 11 if the processor is able to completely decode the code symbol 22. Typically, the processor 11 can verify that it has obtained a complete (e.g., accurate) decoding of a code symbol 22 by error detection means such as checksum functions. Various factors can contribute to the processor's inability to read a given code symbol 22. Some examples include marring of the code symbol 22, blurring of the image 21, an image 21 depicting only a portion of a code symbol 22, or another object obstructing the view of a portion of the code symbol 22. Because the processor 11 typically dynamically analyzes the image 21, a resolution of any of these factors can result in the processor 11 recognizing a previously unrecognized code symbol 22.

Whenever the processor 11 determines that a code symbol 22 in the image 21 is readable by the processor 11, the processor 11 displays on the visual display 15 a positive indicator 25 overlaying the code symbol 22 in the image 21. It will be understood that the term "overlaying" is not intended to mean that the positive indicator 25 completely obscures or covers the code symbol 22. Rather, the term "overlaying" is used to indicate the superimposing of a graphic (e.g., a positive indicator 25) over some or all of a code symbol 22, or in proximity to a code symbol 22, in a manner sufficient to associate the graphic with the code symbol 22 when viewed on the visual display 15. The positive indicator 25 may embrace a variety of different graphics, including a circle (e.g., a circle positioned near the center portion of the code symbol 22), a line (e.g., a line drawn substantially along the perimeter of the code symbol 22), a color highlight of some portion or all of the code symbol 22, or any other suitable graphic. When this positive indicator 25 is displayed in association with a code symbol 22, the user readily understands that the mobile device 10 is ready and able to read that code symbol 22, thereby alleviating uncertainty and improving the user experience.

FIG. 4 depicts an alternative embodiment of the mobile device 10 according to the present disclosure is graphically depicted. In this alternative embodiment, the processor 11 is further configured for displaying on the visual display 15 a negative indicator 26 overlaying the code symbol 22 in the image 21. The negative indicator 26 is displayed when the processor 11 is unable to properly read the code symbol 22. In this way, the user receives intuitive and dynamic feedback indicating that the code symbol 22 cannot be read under current conditions. Furthermore, this functionality serves to prompt the user in real-time to address any factors that may be contributing to the inability of the processor 11 to read the code symbol 22 (e.g., repair the code symbol 22, adjust the camera angle, adjust the camera focus). The negative indicator 26 may be any designated graphic suitable for conveying to the user that the associated code symbol 22 is not readable (e.g., exclamation point, caution symbol, triangle, etc.). To avoid confusion, the negative indicator 26 should be readily distinguishable from the positive indicator 25.

Another advantageous feature of an embodiment of the mobile device 10 according to the present disclosure is that it allows for selectively reading a code symbol 22 in response to input from a user. More particularly, in an alternative embodiment, the processor 11 is configured to read the code symbol 22 in the image in response to a selection input (e.g., a user-initiated direction to read a certain code symbol 22) received from the user interface system 14. When the processor 11 reads the code symbol 22, it both converts the code symbol 22 into data and outputs the data (e.g., to an application interface or to a memory). Typically, the user input is obtained via interaction with a touchscreen. Consequently, in one embodiment, the visual display 15 comprises a touchscreen. The user simply looks at the visual display 15 and selects the code symbol 22 to be decoded. The selection input is sent to the processor 11, which then reads the selected image. The resulting data may then be used by the processor 11 to obtain information corresponding to the code symbol 22 (e.g., by querying the database 18). This approach of allowing the user to select which code symbol 22 to read (e.g., by touching the code symbol 22 on the touch screen) greatly reduces user confusion, particularly when multiple code symbols 22 are in the field of view of the camera 13. Under prior systems, decoding in such a multi-code symbol environment often left the user uncertain as to which code symbol 22 was actually read by the mobile device 10. Allowing the user to select the code symbol 22 to read more closely approximates the use of a trigger on a traditional code reader system. This approach is both more intuitive, especially to users accustomed to a trigger-equipped code reader system, and more precise.

It is within the scope of the present disclosure for the foregoing steps of the disclosed method of reading a code symbol with a mobile device—namely the steps of (i) providing a mobile device 10 having a camera 13, a user interface system 14 having a visual display 15, and a processor 11 communicatively coupled to the camera 13 and the user interface system 14; (ii) capturing with the camera 13 an image 21 including a code symbol 22; (iii) displaying the image 21 on the visual display 15; (iv) determining with the processor 11 whether the code symbol 22 is readable by the processor 11; and (v) displaying on the visual display 15 a positive indicator 25 overlaying the code symbol 22 when the processor 11 determines that the code symbol 22 is readable by the processor—to be interrupted by another process on the mobile device 10. For example, these steps may be interrupted if the mobile device 10 receives a phone call. During the interruption, these steps may be paused or continued in the background of the mobile device 10. Once the interruption has concluded (e.g., the call has ended), these steps may be resumed and/or returned to the foreground of the mobile device 10.

To supplement the present disclosure, this application incorporates entirely by reference the following patents, patent application publications, and patent applications: U.S. Pat. No. 6,832,725; U.S. Pat. No. 7,159,783; U.S. Pat. No. 7,413,127; U.S. Pat. No. 7,726,575; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Pat. No. 8,459,557; U.S. Pat. No. 8,469,272; U.S. Pat. No. 8,474,712; U.S. Pat. No. 8,479,992; U.S. Patent Application Publication No. 2012/0111946;

U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); and U.S. patent application Ser. No. 13/927,398 for a Code Symbol Reading System Having Adaptive Autofocus, filed Jun. 26, 2103 (Todeschini).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A mobile device, comprising:
   a camera;
   a user interface system comprising a visual display; and
   a processor communicatively coupled to the camera and the user interface system, the processor being configured for:
   capturing from the camera an image depicting a code symbol;
   displaying the image on the visual display;
   determining whether the code symbol in the image is readable by the processor; and
   displaying on the visual display a positive indicator overlaying the code symbol in the image when the processor determines that the code symbol in the image is readable by the processor.

2. The mobile device of claim 1, wherein the processor is configured for:
   reading the code symbol in the image in response to a selection input received from the user interface system.

3. The mobile device of claim 2, wherein the visual display comprises a touchscreen and the selection input is initiated by a user's tactile command selection of the code symbol in the image appearing on the touchscreen.

4. The mobile device of claim 3, wherein the tactile command comprises touching the code symbol on the display screen with the user's finger.

5. The mobile device of claim 3, wherein the tactile command comprises touching the code symbol on the display screen with a stylus.

6. The mobile device of claim 3, wherein the tactile command comprises pointing at the code symbol on the display screen.

7. The mobile device of claim 3, wherein the tactile command comprises looking at the code symbol on the display screen for a predetermined period of time.

8. The mobile device of claim 1, wherein the code symbol comprises a barcode symbol.

9. The mobile device of claim 1, wherein the positive indicator comprises a circle.

10. The mobile device of claim 1, wherein the positive indicator comprises a line drawn substantially along the perimeter of said code symbol.

11. The mobile device of claim 1, wherein the positive indicator comprises a color highlight of the code symbol.

12. The mobile device of claim 1, wherein the processor is configured for displaying on the visual display a negative indicator overlaying the code symbol in the image when the processor determines that the code symbol in the image is not readable by the processor.

13. A method of reading a code symbol with a mobile device, comprising:
    providing a mobile device having a camera, a user interface system having a visual display, and a processor communicatively coupled to the camera and the user interface system;
    capturing with the camera an image including a code symbol;
    displaying the image on the visual display;
    determining with the processor whether the code symbol is readable by the processor;
    displaying on the visual display a positive indicator overlaying the code symbol when the processor determines that the code symbol is readable by the processor.

14. The method of claim 13, comprising:
    reading the code symbol with the processor in response to a selection input from the user interface system.

15. The method of claim 14, wherein the visual display comprises a touchscreen and the selection input is initiated by a user's tactile command selecting the code symbol in the image appearing on the touchscreen.

16. The method of claim 13, comprising:
    displaying on the visual display a negative indicator overlaying the code symbol when the processor determines that the code symbol is not readable by the processor.

17. The method of claim 13, wherein the code symbol comprises a barcode symbol.

18. The method of claim 13, wherein the positive indicator comprises a circle.

19. The method of claim 13, wherein the positive indicator comprises a line drawn substantially along the perimeter of the code symbol.

20. The method of claim 13, wherein the positive indicator comprises a color highlight of the code symbol.

* * * * *